April 26, 1966    H. J. DONELSON, JR    3,248,117
MATERIAL SPREADING MEANS FOR GRAIN STORAGE
BINS AND THE LIKE
Filed April 15, 1963     2 Sheets-Sheet 1

INVENTOR.
HARLAN J. DONELSON, JR.
BY
Dick, Zarley + Henderson
ATTORNEYS

WITNESS
NORMAN G. TRAVISS

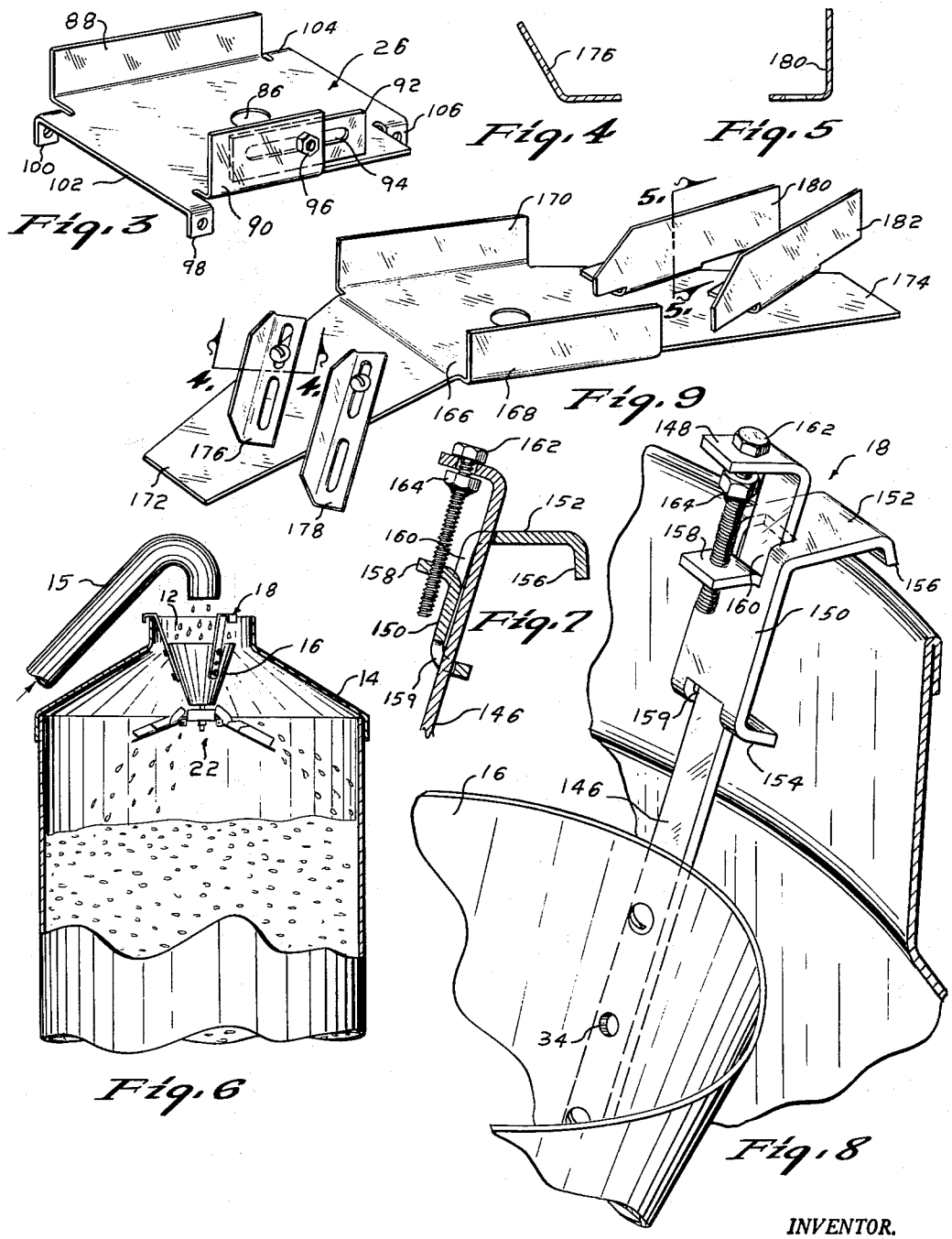

United States Patent Office 3,248,117
Patented Apr. 26, 1966

3,248,117
MATERIAL SPREADING MEANS FOR GRAIN STORAGE BINS AND THE LIKE
Harlan J. Donelson, Jr., W. Highway 330, Marshalltown, Iowa
Filed Apr. 15, 1963, Ser. No. 272,944
8 Claims. (Cl. 275—15)

Grain and similar feed materials are normally introduced into access openings in the tops of storage bins. The feed has a tendency to fall into a pyramid-shaped pile within the bin. Such a disposition of the feed creates certain problems; among which are the spoilage of the feed and an inefficient use of the space within the bin. My invention relates to a device for maintaining the feed at a uniform level within the bin as it is being introduced into the bin.

An object therefore of my invention is to provide a material spreading means for grain storage bins and the like, which can provide a variety of material distribution patterns to accommodate bins of different sizes and materials of different density and texture.

A further object of my invention is to provide a material spreading means for grain storage bins and the like, which can have its speed of operation selectively varied.

A still further object of my invention is to provide a material spreading means for grain storage bins and the like, which can have the direction of rotation of the material scattering means selectively reversed.

A still further object of my invention is to provide a material spreading means for grain storage bins and the like, which can be selectively adjusted to a level position on the bin.

A still further object of my invention is to provide a material spreading means for grain storage bins and the like, wherein the rotational speed of the material scattering means will influence the operating position of material scattering elements.

A still further object of my invention is to provide a material spreading means for grain storage bins and the like, that will permit the accummulation of material directly under the unit if desired.

A still further object of my invention is to provide a material spreading means for grain storage bins and the like, which may be used in bin access openings of different sizes.

A still further object of my invention is to provide a material spreading means for grain storage bins and the like, wherein the center of gravity of the material scattering elements may be selectively varied to change its operating position.

A still further object of my invention is to provide a material spreading means for grain storage bins and the like, which may be selectively lowered and raised within the bin.

A still further object of my invention is to provide a material spreading means for grain storage bins and the like, wherein a high speed motor is used to power a relative low speed scattering means.

A still further object of my invention is to provide a material spreading means for grain storage bins and the like, wherein the scattering element's position is a function of the speed of the scattering means or they may be held in a fixed position for all speeds.

It is a further object of my invention to provide a material spreading means for grain storage bins and the like wherein the distance between the scattering means and its support structure may be selectively varied.

It is also an object of my invention to provide a material spreading means for grain storage bins and the like wherein the electrical motor powering the scattering means is cooled by the flow of grain and similar material by it.

It is still a further object of this invention to provide a material spreading means for grain storage bins and the like, which is economical to manufacture, durable in use and refined in appearance.

These objects, and other features and advantages of this invention will become readily apparent upon reference to the following description when taken in conjunction with the accompanying drawings, wherein:

FIG. 3 is a perspective view of the support plate element in the scattering plate assembly;

FIG. 4 and FIG. 5 are sectional views through the deflector fins of my device as taken on lines 4—4 and 5—5 respectively of FIG. 9.

FIG. 6 is a sectional view of a grain storage bin with my device mounted therein.

FIG. 7 is a cross sectional view of the extendable support arm unit illustrated in FIG. 8 securing the spreader assembly to the side of a grain bin.

FIG. 8 is a fragmentary perspective view of the spreader assembly secured to the side of a grain bin by a support arm unit.

FIG. 9 is a perspective view of a modified form of the scattering plate assembly.

Figures 1, 2:
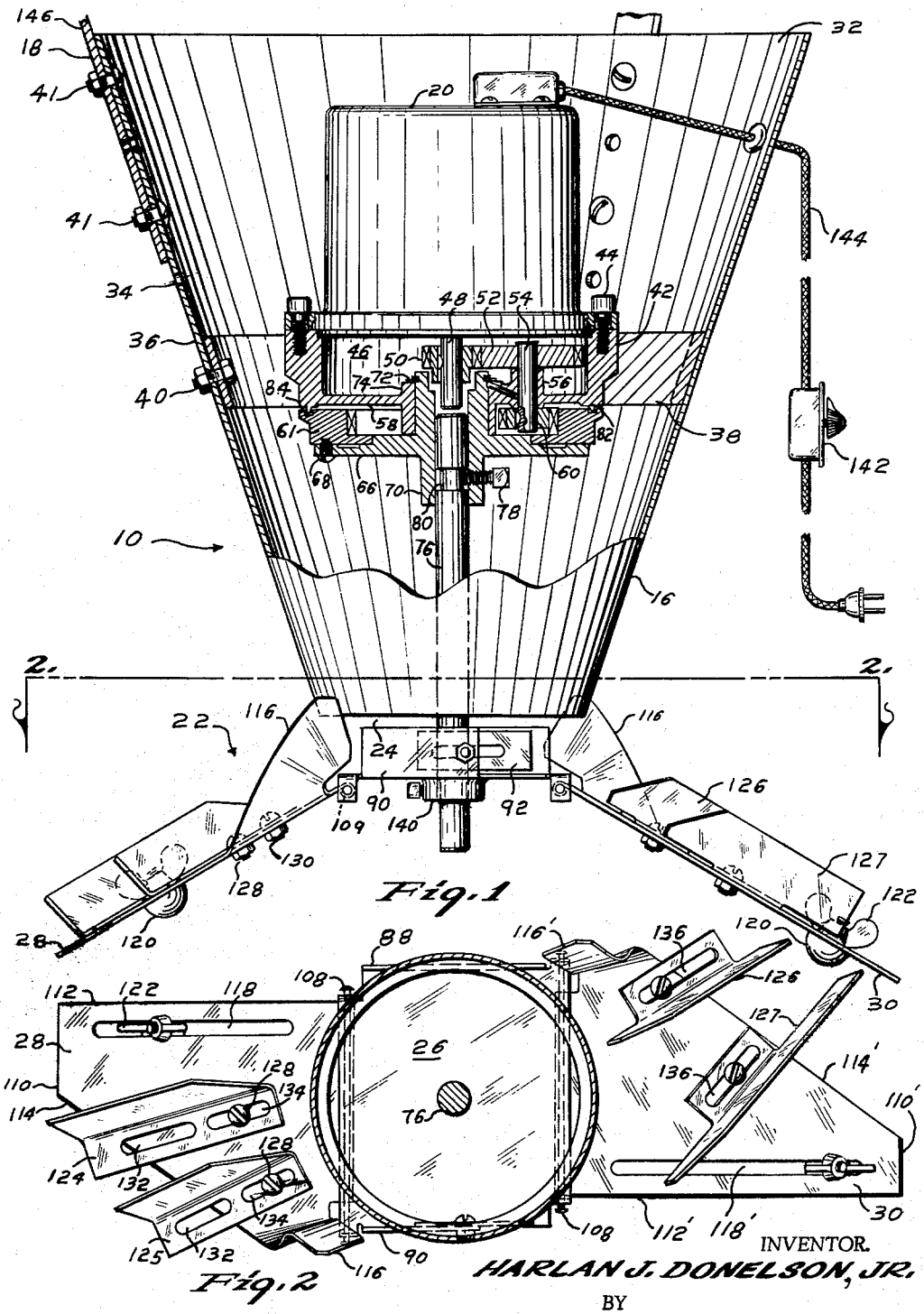
FIG. 1 is a partial sectional view of my device illustrating one operating position and illustrating its power means.
FIG. 2 is a sectional view of my device taken on line 2—2 of FIG. 1.

In the drawings it will be seen in FIGS. 1 and 6 that this invention comprises generally a spreader assembly 10 mounted in the top opening 12 of a grainery 14. Grain or the like is dropped into the opening 12 by a conveyor means 15. The spreader assembly 10 includes a funnel unit 16 supported in the opening 12 by extendable support arms 18. A motor 20 mounted in the funnel unit 16 drives a scatering plate assembly 22 mounted at the bottom opening 24 of the funnel unit 16. One embodiment of the scatering plate assembly 22 is illustrated in FIGS. 1 and 2 and comprises a support plate element 26 (FIG. 3) with a pair of pivotal wing elements 28 and 30 pivotally mounted at opposite ends thereof.

The funnel unit 10 is in the shape of an inverted truncated hollow cone, having an upper inlet opening 32 and a bottom outlet opening 24. Spaced vertical rows of openings 34 are formed in the wall 36 of the funnel unit 16. A circular plate 38 is mounted in mating relationship against the inside wall 36 and secured thereto by bolts 40.

The motor 20 positioned in the funnel unit 16 is secured to a support member 42 by bolts 44. The support member 42 is then secured to the circular plate 38 in any convenient manner.

The support member 42 has a cavity 46 formed therein to receive the driveshaft 48 with a gear 50 mounted thereon. The gear 50 engages a larger gear 52 mounted on a shaft 54, which extends through a bearing member 56 formed in the base 58 of the cavity 46. On the opposite end of the shaft 54 from the gear 52 is mounted a relatively smaller gear 60. The teeth of gear 60 engage the teeth formed on the inside of ring gear 61. The ring gear 62 is secured at its bottom side to a plate element 66 by bolts 68. In the center of plate element 66, a bushing 70 is provided which extends through the ring gear 61 and the base 58. The upper end of the bushing 70 has a peripheral recess formed therein to receive a locking element 72 which also engages the top shoulder 74 of a bearing formed in the center of base 58.

A drive shaft 76 is secured in the bushing 70 by a set screw 78, which engages an annular recess 80 formed in the drive shaft 76.

The support member 42 has an annular shoulder 82 formed in the bottom surface thereof and is positioned in a race 84 formed in the upper face of the gear 61.

The drive shaft 76 extends out the lower opening 24 of the funnel unit 16 centrally thereof and the scattering plate assembly 22 is mounted on the lower end thereof and is adapted to be rotated thereby.

Referring now to FIG. 3, it is seen that the support plate element 26 has an opening 86 formed in the center thereof. The support plate element 26 has formed on one side thereof an upstanding flange portion 88 and the opposite side a second flange porton 90 extending from one end of the support plate element approximately half its length. A plate element 92 having an elongated slot 94 formed therein is positioned on the inside of the second flange 90 and is adjustably secured there along by bolt element 96 extending through the second flange 90 and the elongated slot 94. Upon full extension of plate element 92 the flange 90 has an effective length equal to flange 88 on the opposite side of the support plate 26.

Tab portions 98 and 100 have been bent from the base 102 of the support plate element 26 at one end thereof and extend perpendicular and downwardly thereof. At the opposite end from tab portions 98 and 100 are similar tab portions 104 and 106. However, the center point between tab portions 98 and 100 lies on the opposite side of a line longitudinally through the center of the base 102 from the center point between tab portions 104 and 106.

Referring now to FIGURES 1 and 2 it can be seen that wing elements 28 and 30 are pivotally connected at opposite ends of the tab elements 98 and 100 and 104 and 106 respectively by mounting pins 108.

Each of wing elements 28 and 30 are similar in construction except that wing 30 is longer than wing 28 and the following description will, therefore, refer to each. As seen in FIG. 1, the inner end of each wing 28 and 30 pivoted on the pin 108 to the support plate 26 is curled under to form a tube 109 to receive the pin 108. The end edge 110 (FIG. 2) opposite the tube 109 is parallel thereto and extends from perpendicular side edge 112 less than half of the width of the wing element. A fourth edge 114 extends from the outer end edge 110 toward the tube 109 and terminates adjacent thereof in an upstanding lip 116, which is bent inwardly and then outwardly terminating slightly above the bottom end of the funnel unit 16 (FIG. 1).

Adjacent and parallel to the edge 112 is formed an elongated slot 118 extending substantially the length of the wing element. A weighted bolt 120 extends from the bottom side through the elongated slot 118 and is secured thereto by a wing nut 122. The weighted bolt 120, it is seen, can be moved selectively along the length of the wing element 28.

A pair of deflector fins 124 and 125 are secured to the top surface of the wing 28 by bolts 128 and 130 respectively. Each of the fins 124 and 125 carried by wing 28 is generally L shaped in cross section, but as seen in FIG. 4, the angle between the legs of the L is greater than 90 degrees. On the other hand, the deflector fins 126 and 127 carried by wing 30 are definitely L shaped in cross section, as seen in FIG. 5. In the leg portions of fins 124 and 125 engaging the top face of the wing 28, is formed a pair of elongated slots 132 and 134 to selectively receive bolt means 128. It is noted however that fins 126 and 127 (FIG. 2) have only one elongated slot 136. The edge of each of the upstanding legs adjacent the pivoted end of the wings is tapered upwardly and rearwardly for each of the fins 124–127 (FIGS. 1, 2 and 9).

After the scattering plate assembly 22 is assembled by pivotally mounting wings 28 and 30 on support plate element 26, the scattering plate assembly 22 is then mounted on the end of the drive shaft 76 and held there by bushing 140 welded on the bottom surface of the support plate element 26. By use of a set screw inserted in the bushing into engagement with the drive shaft 76 the scattering plate assembly 22 is positively held thereon.

The scattering plate assembly 22 is driven by the motor 20 controlled by rheostat switch 142 (FIG. 1) in the electrical power line 144. The rheostat switch 142 is adapted to vary the speed of the motor 20 in either a clockwise or counterclockwise direction.

When the spreader assembly 10 is positioned in the grainery 14 it is mounted on extendable support arms 18 (FIGS. 7 and 8) which comprise an elongated plate member 146 having its upper end 148 bent at a 90 degree angle thereto. An opening is formed through the end 148. A second plate member 150 has each of its ends 152 and 154 bent in the same direction at right angles thereto. The outer end of end 152 is bent downwardly and outwardly to form a flange 156 (FIGS. 7 and 8). From the end portion 152 is formed a tab portion 158 by making a transverse slit in the end portion 152 and parallel side slits extending over the bend and along the plate 150 a short distance. The tab portion 158 is then bent out of the plane of the plate 150 to a position extending perpendicular thereto and in an opposite direction from its ends 152 and 154. A small opening is then formed in the tab portion 158.

An enlarged opening 159 is then formed in the end portion 154 adjacent its bend connection with the plate 150. The bending of the tab portion 158 out of the plane of the plate 150 forms an opening 160, which is in alignment with the opening 159. The elongated plate 146 is then inserted through the openings 160 and 159 in ends 152 and 154 respectively such that the upper end 148 extends parallel and above the tab portion 158 and the openings therein are in alignment. A threaded bolt 162 is inserted through the end 148 and engages threads formed in the opening in the tab portion 158. A retaining nut 164 is welded on to the bolt 162 below the end 148. Thus it is seen that by advancing the bolt means 162 the elongated plate 146 will move toward the second plate member 150 thereby lowering the spreader assembly 10. Likewise turning the bolt 162 counterclockwise will cause the spreader assembly to be raised relative to the grainery 14.

Further relative adjustment between the spreader assembly 10 and the grainery 14 may be accomplished by selectively securing the plate member 146 at the desired vertical position on the funnel unit 16 and securing the same by bolts 41 extending through the appropriate holes 34 in the funnel connecting them to the plate 146 (FIG. 1).

When the spreader assembly 10 is mounted in the top opening 12 of the grainery 14, the end portion 152 (FIG. 8) in each of the extendable support arms 18 will bear against the rim of the top opening 12. The end portion 152 may be considered the base of a channel formed by the flange 156 and the plate member 150. Therefore, only extreme lateral movement by the spreader assembly would cause separation of the extendable support arm 18 from the rim of the bin 14.

A second embodiment of the scattering plate assembly 22 is illustrated in FIG. 9. This embodiment comprises a rectangular support plate element 166 having upstanding side flanges 168 and 170 running the full length thereof. Wing elements 172 and 174 are integral with the support plate and extend in opposite directions from the ends thereof. Wing element 172 extends slightly downwardly from the support plate 166, while wing element 174 extends in the same plane as the support plate 166.

The deflector fins 176 and 178 mounted on the wing element 172 are identical to fins 124 and 125 on wing 28 (FIG. 2) and fins 180 and 182 on wing 174 are identical to those (126 and 127) on wing 30 in FIG. 2.

In operation, the pattern of the scattered grain may be altered in several ways. First, the speed of the motor 20 may be changed to throw the grain from the scattering plate assembly 2 farther as necessary. This is accomplished by the wing elements 28 and 30 in the embodiment shown in FIGS. 1, 2, and 6 moving toward a horizontal plane as the speed of the scattering plate assembly 22 increases due to the centrifugal force thereon. The centrifugal force is varied by moving the weighted bolts 120 along the length of the wing elements 28 and 30. As the wings 28 and 30 move closer toward the horizontal plane, the farther the grain will be thrown.

The deflector fins 124, 125, 126 and 127 may be adjusted angularly with respect to their respective wing elements 28 and 30. The greater the angle the less distance the grain will be thrown. The L shaped fins 126 and 127 will cause a greater amount of grain to be thrown outwardly by the spreader assembly than the other fins 124 and 125 having a greater angle than 90 degrees between their legs because the grain will spill over the upstanding legs of fins 124 and 125 into the center of the bin. If it is desired to fill the grainery in a central or middle area, the scattering plate assembly can first be moved longitudinally away from the lower edge of the funnel 16 to let more grain escape the scattering plate assembly and fall directly into the center of the bin. Secondly, the plate element 92 (FIG. 3) may be moved into overlapping relationship with flange 90 to permit escape of grain directly into the center of the bin. The upstanding lip 116 on each of wings 28 and 30 will tend to funnel the gain into the wing and fin area rather than off the support plate 26 into the center of the grainery.

The second embodiment of the scattering plate assembly shown in FIG. 9 additionally will impart a different pattern to the grain as it is introduced into the grainery. The deflector fins 176, 178, 180, and 182 may be adjusted in any desired angular relationship to their fixed wings 172 and 174 respectively and finally, by reversing the motor through the rheostat 142, another discharge pattern of grain distribution will be produced.

It is to be understood that the tendency of the motor 20 to overheat in the funnel 16 is minimized by the cooling air drawn through the funnel 16 by the movement of grain past the motor 20 into the grainery 14.

Some changes may be made in the construction and arrangement of my material spreading means for grain storage bins and the like without departing from the real spirit and purpose of my invention, and it is my intention to cover by my claims, any modified forms of structure or use of mechanical equivalents which may be reasonably included within their scope.

I claim:
1. In a spreader assembly,
a funnel unit having an inlet and an outlet opening;
a motor positioned in and secured to said funnel unit;
a speed reduction transmission secured to the lower side of said motor and having an output power shaft extending beyond the outlet opening of said funnel unit; and a scattering assembly comprising a support plate having an upstanding flange extending along two sides thereof, a wing element extending from each of the ends of said support plate, at least one of said wing elements extending downwardly from said support plate; a deflector fin being generally L shaped in cross-section and having a slot in the base leg for receiving a bolt means, each wing element having at least one deflector fin positioned on the top surface thereof and selectively adjustable by a bolt means both longitudinally and rotationally of said wing element.

2. In a spreader assembly,
a funnel unit having an inlet and an outlet opening,
a power means secured to said funnel and operatively secured to a shaft means positioned in said funnel and extending from said outlet opening,
and a scattering assembly positioned at the outlet opening of said funnel and having a support element secured to said shaft means, at least one plate wing element freely pivotally mounted on said support element and adapted to pivot by centrifugal force from a downwardly extending position to a substantially horizontally extending position as the speed of rotation of said shaft and support element is increased,
said support element having side flanges secured thereto and extending toward said funnel unit, one of said flanges comprises two flange portions, one of which is slidably movable relative to the other to permit communication between the support plate element and the outside.

3. In a spreader assembly,
a funnel unit having an inlet and an outlet opening,
a power means secured to said funnel and operatively secured to a shaft means positioned in said funnel and extending from said outlet opening,
and a scattering assembly positioned at the outlet opening of said funnel and having a support element secured to said shaft means, at least one plate wing element freely pivotally mounted on said support element and adapted to pivot by cenrifugal force from a downwardly extending position to a substantially horizontally extending position as the speed of rotation of said shaft and support element is increased,
said wing element having at least one rotatably adjustable deflector fin mounted thereon.

4. In a spreader assembly,
a funnel unit having an inlet and an outlet opening,
a power means secured to said funnel and operatively secured to a shaft means positioned in said funnel and extending from said outlet opening,
and a scattering assembly positioned at the outlet opening of said funnel and having a support element secured to said shaft means, at least one plate wing element freely pivotally mounted on said support element and adapted to pivot by centrifugal force from a downwardly extending position to a substantially horizontally extending position as the speed of rotation of said shaft and support element is increased,
said wing element having at least one rotatably adjustable deflector fin mounted thereon, said deflector fin having a base portion and an upstanding side portion, said base portion having an elongated opening formed therein parallel to its longitudinal axis, bolt means extending through said elongated opening and secured to said wing element, said deflector fin being adapted to be selectively rotated to a desired angle relative to said wing element, said deflector fin adapted to be selectively moved lengthwise relative to said wing element.

5. In a spreader assembly,
a funnel unit having an inlet and an outlet opening,
a power means secured to said funnel and operatively secured to a shaft means positioned in said funnel and extending from said outlet opening,
and a scattering assembly positioned at the outlet opening of said funnel and having a support element secured to said shafts means, at least one plate wing element freely pivotally mounted on said support element and adapted to pivot by centrifugal force from a downwardly extending position to a substantially horizontally extending position as the speed of rotation of said shaft and support element is increased,
said wing element having at least one rotatably adjustable deflector fin mounted thereon, said deflector fin having a base portion and an upstanding side portion, said base portion having an elongated opening formed therein parallel to its longitudinal axis, bolt means extending through said elongated opening and secured to said wing element, said deflector fin being adapted to be selectively rotated to a desired angle relative to said wing element, said deflector fin adapted to be selectively moved lengthwise relative to said wing element, said angle between the base portion of said deflector fin on said wing element and its upstanding side portion being greater than 90 degrees.

6. In a spreader assembly, a funnel unit having an inlet and an outlet opening, a power means secured to said funnel and operatively secured to a shaft means positioned in said funnel and extending from said outlet opening, and a scattering assembly positioned at the outlet opening of said funnel and having a support element secured to said shaft means, at least one plate wing element freely pivotally mounted on said support element and adapted to pivot by centrifugal force from a downwardly extending position to a substantially horizontally extending position as the speed of rotation of said shaft and support element is increased, said wing element having at least one rotatably adjustable deflector fin mounted thereon and a weight means secured to and selectively movable along said wing element to and away from said support plate element.

7. In a spreader assembly, a funnel unit having an inlet and an outlet opening, a power means secured to said funnel and operatively secured to a shaft means positioned in said funnel and extending from said outlet opening, and a scattering assembly positioned at the outlet opening of said funnel and having a support element secured to said shaft means, at least one plate wing element freely pivotally mounted on said support element and adapted to pivot by centrifugal force from a downwardly extending position to a substantially horizontally extending position as the speed of rotation of said shaft and support element is increased, said wing element having at least one rotatably adjustable deflector fin mounted thereon, said deflector fin having a base portion in engagement with said wing element and an upstanding side portion, a weight means secured to and selectively movable along said wing element to and away from said support plate element, said power means having a variable and a reversible speed control for driving said scattering assembly whereby the pattern of grain distribution may be selectively varied.

8. In a spreader assembly, a funnel unit having an inlet and an outlet opening, a power means secured to said funnel and operatively secured to a shaft means positioned in said funnel and extending from said outlet opening, and a scattering assembly positioned at the outlet opening of said funnel and having a support element secured to said shaft means, at least one plate wing element freely pivotally mounted on said support element and adapted to pivot by centrifugal force from a downwardly extending position to a substantially horizontally extending position as the speed of rotation of said shaft and support element is increased, said wing element having two parallel edges and two non parallel edges, said wing element being pivotally connected to said support plate element along one of said parallel edges, one of said non parallel edges terminating adjacent the lower edge of the funnel outlet in an upstanding lip portion, said lip portion bent inwardly and thence outwardly of said wing element and lower edge of the funnel outlet.

References Cited by the Examiner

UNITED STATES PATENTS

| | | | |
|---|---|---|---|
| 464,284 | 12/1891 | Meyberg | 248—327 |
| 1,260,123 | 3/1918 | Areson | 248—327 |
| 2,497,406 | 2/1950 | Graham | 214—17.64 |
| 2,862,717 | 12/1958 | Ronning | 275—8 |
| 3,001,465 | 9/1961 | Donelson | 198—128 X |
| 3,041,708 | 7/1962 | Holtz | 29—150 |
| 3,045,840 | 7/1962 | Donelson | 214—17 |
| 3,064,833 | 11/1962 | Von Ruden | 214—17.64 |
| 3,065,523 | 11/1962 | Sloyan | 29—150 |

GERALD M. FORLENZA, *Primary Examiner.*

HUGO O. SCHULZ, *Examiner.*